United States Patent [19]

Jones et al.

[11] Patent Number: 4,917,849
[45] Date of Patent: Apr. 17, 1990

[54] PROCESS FOR PREPARING IONOMERS

[75] Inventors: Jeffrey A. Jones; Manfred Heimberg, both of Cincinnati, Ohio

[73] Assignee: National Distillers and Chemical Corporation, New York, N.Y.

[21] Appl. No.: 112,586

[22] Filed: Oct. 26, 1987

[51] Int. Cl.$^4$ ............................ D01F 6/34; D01F 6/36
[52] U.S. Cl. .................................. 264/211.24; 525/57
[58] Field of Search ...................... 525/57; 264/211.24

[56] References Cited

U.S. PATENT DOCUMENTS

| | | | |
|---|---|---|---|
| 3,426,107 | 2/1969 | Scruggs et al. ........................ | 525/57 |
| 3,975,463 | 8/1976 | Hirata et al. .......................... | 525/57 |
| 4,108,948 | 8/1978 | Pritchett ................................ | 525/57 |
| 4,349,644 | 9/1982 | Iwanami et al. ....................... | 525/57 |
| 4,645,695 | 2/1987 | Negi et al. ............................. | 525/57 |

FOREIGN PATENT DOCUMENTS

| | | | |
|---|---|---|---|
| 86579 | of 1975 | Japan ..................................... | 525/57 |
| 131033 | of 1980 | Japan ..................................... | 525/57 |

*Primary Examiner*—Jacob Ziegler

[57] ABSTRACT

A process for preparing ionomers is disclosed. In this process a vinyl acetate polymer is contacted with a hydroxide of an alkali metal or an alkaline earth metal. The in situ formed acetate of an alkali metal or an alkaline earth metal of this reaction is in turn reacted with a polymer having carboxylic acid or diacid anhydride funtionality to produce the ionomer.

22 Claims, No Drawings

PROCESS FOR PREPARING IONOMERS

BACKGROUND OF THE DISCLOSURE

1. Field of the Invention

The present invention is directed to a process for preparing ionomers. More specifically, the present invention is directed to a process for preparing ionomers by contacting the polymer to be ionomerized with the reaction product of a vinyl acetate polymer and a hydroxide compound.

2. Background of the Prior Art

Ionomers are attractive polymers in that they provide the advantages of thermoplastic and thermosetting polymers. These polymers are formed by ionically cross-linking a polymer possessing carboxylic acid or diacid anhydride functionality with metal ions to produce an ionic polymeric salt.

These polymers are usually formed by reacting a polymer having acid functionality with a base, usually a metal hydroxide, acetate or the like. Unfortunately, inorganic bases, such as alkali metal hydroxides, are insoluble in polymers having carboxylic acid functionality. Thus, the degree of reaction between the base and the polymer is relatively low.

One means of overcoming this problem involves the use of a solvent for the polymer and the base. This expedient improves the degree of reaction between the polymer and the base. However, the recovery of the ionomer product from the solution adds new complexities to the process. Those skilled in the art are aware of the difficulties attendant the recovery of an ionic polymer from a solution. These include the energy requirement associated with the removal of the solvent as well as the safety and health problems resulting from handling the often toxic and inflammable solvents utilized in this process. In addition, environmental problems associated with the disposal of the spent solvent adds further difficulty to the challenges associated with this method.

In view of the problems associated with the use of a solvent system for improving contact between the polymer to be ionomerized and the base, an alternate process is oftentimes employed. In this process the polymer is melted and the base is dispersed therein. Obviously, this method is limited in its effectiveness due to the limited improvement in contact between the polymer and the base. As such, large expenditures of energy, spent in melting the polymer and mixing the dispersion, is required to completely ionomerize the polymer. Even so, only approximately 30% to 40% by weight of the base, necessarily provided in stoichiometric excess, is usually reacted. The unfortunate result of this poor conversion is formation of a dispersion of the base in the ionomer. As a result, the ionomer is hazy, containing visible particles of the base compound.

Thus, the melt dispersion method suffers from an important deficiency of the solution method, high energy requirements. In addition, the resultant ionomer product is usually characterized by the presence of unreacted hydroxide particles which impart a hazy appearance to the resultant ionomer.

An attempt to overcome the problems associated with the solution and melt dispersion methods is addressed in U.S. Pat. No. 4,666,988. This patent attempts to overcome problems associated with ionomerization by providing a uniform dispersion of a metal oxide in a carboxyl-containing ethylene copolymer. This is accomplished by making a masterbatch blend of the metal oxide in a polyethylene resin. This process, directed primarily to employing magnesium oxide as the metal oxide, preferably utilizes a linear low density polyethylene as the ethylene polymer dispersing agent. However, the process of the '988 patent does not involve the generation of an effective, in situ formed, base uniformly dispersed in a thermoplastic resin.

The above remarks establish the need in the art for a more effective process of ionomerizing polymers having acid functionality which process is more effective than the solvent and melt dispersion methods used in the ionomerization methods of the prior art.

SUMMARY OF THE INVENTION

The present invention is directed to a new process for ionomerizing polymers having acid functionality which produces excellent yields at low temperature over short periods of time which does not entail the addition of a solvent.

In accordance with the present invention a process for preparing ionomers is provided. In this process a vinyl acetate polymer is contacted with a hydroxide of an alkali metal or an alkaline earth metal. The product of this metal or an reaction, an in situ formed acetate of the alkali metal or alkaline earth metal in a hydrolyzed vinyl acetate polymer is, in turn, reacted with a polymer having carboxylic acid or diacid anhydride functionality.

DETAILED DESCRIPTION

The process of the present invention involves ionomerizing a polymer having acid functionality with an ionomerizing agent. The polymers having acid functionality within the contemplation of this invention are those having carboxylic acid functionality or diacid anhydride functionality. Polymers having carboxylic acid functionality within the scope of this invention are preferably polymers of unsaturated acids. More preferably, these unsaturated acid functionality polymers are monofunctional or difunctional unsaturated acids. Among the examples of such carboxylic acid polymers are polymers of acrylic acid, alkylacrylic acids, maleic acid, fumaric acid, half-esters of maleic acid, half-esters of fumaric acid and the like. A particularly preferred polymer of a compound having diacid functionality is a polymer of maleic anhydride.

The polymers having acid functionality discussed above are preferably provided as copolymers with olefins, vinyl compounds or the like. Copolymers having acid functionality within the scope of the present invention may be graft copolymers of olefins, vinyl compounds or the like to which monomers having carboxylic acid functionality or diacid anhydride functionality are grafted. Alternatively, the carboxylic acid monomer or diacid anhydride may be copolymerized with an olefin, a vinyl compound or the like to form an interpolymer with each other or with each other and other monomers.

Among the polymers that are contemplated as being among the polymers ionomerized in accordance with the process of this invention are ethylene-acrylic acid copolymers, ethylene-methacrylic acid copolymers, copolymers of ethylene and a half ester of maleic acid, copolymers of ethylene and maleic anhydride, terpolymers of ethylene, vinyl acetate and acrylic acid, terpolymers of ethylene, propylene and a half ester of fumaric acid, copolymers of styrene and maleic anhydride, terpolymers of ethylene, vinyl acetate and maleic anhydride, terpolymers of ethylene, propylene and maleic anhydride and the like.

The unique ionomerizing agent of the present invention is the reaction product of a vinyl acetate polymer and a hydroxide of an alkali metal or an alkaline earth metal. The result of this reaction is a hydrolyzed terpolymer of ethylene, vinyl acetate and vinyl alcohol. In the event of total hydrolysis, the polymer resulting is a copolymer of ethylene and vinyl alcohol. The degree of hydrolysis, as those skilled in the art are aware, is a function of the polymer ionomerized. Usually, the vinyl acetate polymer component of the ionomerizing agent of the present invention is about 20% and 100% hydrolyzed. More preferably, the degree of hydrolysis is in the range of between about 50% and about 95%. The co-product of this reaction is the in situ formed acetate of an alkali or an alkaline earth metal. It is this uniformly dispersed, in situ formed alkali metal acetate or alkaline earth metal acetate that reacts with the acid functional group of the polymer to be ionomerized to produce a polymer of a metal ester which is ionically crosslinked.

As stated above, one of the reactants which results in the formation of the ionomerizing agent of this invention is an alkali metal hydroxide, an alkaline earth metal hydroxide or mixtures thereof. Of these two classes of metal hydroxides, the alkali metal hydroxides are preferred. Of the alkali metal hydroxides, potassium hydroxide and sodium hydroxide are more preferred. Most preferably, the hydroxide used to form the ionomerizing agent of this invention is sodium hydroxide.

The other reactant in the formation of the ionomerizing agent of this invention is a vinyl acetate polymer. The vinyl acetate polymers within the contemplation of this invention are vinyl acetate homopolymers and copolymers. Preferably, a copolymer of an alpha-olefin and vinyl acetate is utilized. More preferably, a copolymer of ethylene and vinyl acetate is employed. Still more preferably, the copolymer of this invention is an ethylene-vinyl acetate copolymer which includes at least 8% weight of vinyl acetate. Even more preferably, the ethylene-vinyl acetate copolymer of this invention is one which includes vinyl acetate in a concentration of between about 8% and about 70% by weight. Still even more preferably, the ethylene-vinyl acetate copolymer reacted with the hydroxide to produce the ionomerizing agent of this invention includes about 20% to about 50% by weight vinyl acetate. Most preferably, the ethylene-vinyl acetate copolymer includes about 28% to about 45% by weight vinyl acetate.

The formation of the ionomerizing agent, the in situ formed acetate of an alkali metal or an alkaline earth metal in a copolymer of vinyl acetate and vinyl alcohol, occurs by reacting the vinyl acetate polymer and the hydroxide of an alkali metal or a alkaline earth metal at a temperature in the range of between about 160° C. and about 200° C. More preferably, this reaction occurs at a temperature of between about 170° C. and about 190° C. Most preferably, the reaction to prepare the ionomerizing agent occurs at about 180° C. The time duration of the reaction to form the ionomerizing agent is preferably over a period of about 2 to about 15 minutes. The reaction is preferably conducted under shear. That is, the reactants are intimately mixed to insure excellent contact between the solid hydroxide and molten polymer.

The second step in the process of this invention, the reaction between the ionomerizing agent and the polymer possessing acid functionality, occurs at a temperature at least 5° C. above the melting temperature of the polymer possessing carboxylic acid or diacid anhydride functionality. More preferably, the ionomerization step occurs at a temperature at least 10° C. above the melting point of the polymer being ionomerized. In a particularly preferred embodiment of the ionomerization reaction, the temperature of the reaction is in the range of between about 100° C. and about 200° C.

The present invention will be better understood with reference to the following examples. In that these examples are given for illustrative purposes only, the invention should not be limited thereto.

EXAMPLE 1

Preparation of In Situ Formed Sodium Acetate Ionomerizing Agent

To a Brabender Plasticorder [trademark] mixing apparatus, maintained at a temperature of 80° C., was added 40 g. of an ethylene-vinyl acetate copolymer (EVA) containing 42.7% vinyl acetate. The Brabender [trademark] mixing device was rotated at 22 revolutions per minute (rpm). To this was added 2.54 g. (0.063 mol) of powdered sodium hydroxide (NaOH). The EVA and NaOH were mixed in the Brabender [trademark] for 5 minutes. The temperature was then raised to 180° C. and the material mixed for an additional 5 minutes at a rotational speed of 40 rpm. The mixture was cooled to 130° C. and removed from the Brabender Plasticorder [trademark].

The product of this reaction was analyzed and found to comprise 37.3 g. of an ethylene-vinyl acetate-vinyl alcohol terpolymer having a residual vinyl acetate concentration of 33% by weight (VA =33% W/W) and 5.2 g. (0.063 mol) of "in situ" formed sodium acetate. It was noted that no visible particles of unreacted sodium hydroxide were observed in this product.

EXAMPLE 2

Ionomerization of an Ethylene Graft Copolymer Utilizing In Situ Formed Sodium Acetate 1.42 G of melt hydrolyzed ethylene-vinyl acetate-vinyl alcohol terpolymer containing 0.175 g. (0.0021 mol) of in situ formed sodium acetate, prepared in accordance with the procedure of Example 1, was charged into a Brabender Plasticorder [trademark] mixer to which was added 40 g. of a graft copolymer of high density polyethylene (HDPE) and monopropyl maleate (monopropyl maleate grafted onto HDPE). The graft copolymer had an acid number of 3.0 (0.002 mol of acid) and a melt index of 10.0, as measured by ASTM Test Procedure D-1238, Condition E. The reactants were mixed in the Brabender [trademark] mixer at 40 rpm at 180° C. for 10 minutes.

The final product recovered from the mixer was an ionomerized polymer, as evidenced by the melt index of the polymer. The ionomerized product was found to have a melt index of 0.5, as again measured by ASTM Test Procedure D-1238, Condition E. The ionomerized product exhibited no visible particles of unreacted base. Those skilled in the art are aware that decrease in melt index is a manifestation of ionic crosslinkage. A summary of this example is provided in the Table.

COMPARATIVE EXAMPLE 1

Ionomerization of an Ethylene Graft Copolymer Utilizing Hydrated Sodium Acetate To establish the improved result obtained by the process of the present invention the same copolymer utilized in Example 2, 40 g. of a copolymer of monopropyl maleate grafted onto HDPE having an acid number of 3.0 (0.002 mol of acid) and characterized by a melt index, as measured by ASTM D-1238, Condition E, of 10.0, was reacted in a Brabender Plasticorder [trademark] with 0.290 g. (0.0021 mol) of hydrated sodium acetate, having the chemical formula $CH_3COONa \cdot 3H_2O$, at 180° C. Contact between the reactants was accomplished, as in Example 2, by blending the graft copolymer and the hydrated sodium acetate in the Brabender [trademark] for 10 minutes at 40 rpm.

The resultant product was analyzed and found to possess a melt index, as determined by ASTM D-1238, Condition E, of 3.8. The product was inspected and found to possess visible particles of unreacted ionomerizing reagent dispersed throughout the product material.

A tabulated summary of Comparative Example 1 appears in the Table.

COMPARATIVE EXAMPLES 2 and 3

Ionomerization of Ethylene Graft Copolymer-Using Anhydrous Sodium Acetate

Comparative Example 1 was repeated except for minor changes in the identity of the ionomerized polymer and the ionomerizing agent. The copolymer of monopropyl maleate grafted onto HDPE in both Comparative Examples 2 and 3 was characterized by a melt index of 9.0. However, the acid number of the polymer was again 3.0 (0.002 mols). In Comparative Example 2 the ionomerizing agent was anhydrous sodium acetate rather than hydrated sodium acetate, charged into the Brabender [trademark] mixer in an amount of 0.3 g. (0.0036 mol). In Comparative Example 3 the amount of anhydrous sodium acetate charged was 0.4 g. (0.0049 mol) As in Comparative Example 1, 40 g. of the graft copolymer was charged in the Brabender [trademark] mixing apparatus in both Comparative Examples 2 and 3.

The reactants were reacted in the same manner as in Comparative Example 1, that is, in a Brabender Plasticorder [trademark] at 40 rpm and 180°, for 10 minutes. The final ionomerized polymers of Comparative Examples 2 and 3 had melt indecies, as measured by ASTM Test Procedure D-1238, Condition E, of 5.8 and 5.4, respectively. As in Comparative Example 1, visible particles of unreacted sodium acetate were dispersed throughout the polymers produced in Comparative Examples 2 and 3.

Comparative Examples 2 and 3 are summarized in the Table.

EXAMPLE 3

Ionomerization of an Ethylene-Vinyl Acetate Terpolymer by In Situ Sodium Acetate Forty grams of a terpolymer formed by grafting monopropyl maleate onto an ethylene-vinyl acetate (EVA) copolymer containing 19% by weight vinyl acetate. The graft copolymer was characterized by a melt index of 50 as determined by ASTM Test Procedure D-1238, Condition B and an acid number of 7.9 (0.0056 mol of acid). The graft terpolymer was charged into a Brabender Plasticorder [trademark] rotating at 40 rpm. To this was added the ionomerizing agent, 0.086 g. (0.001 mol) of in-situ formed sodium acetate in 0.7 g. of ethylene-vinyl acetate-vinyl alcohol terpolymer. This ionomerizing agent was formed in accordance with the procedure of Example 1.

The graft copolymer and the ionomerizing agent were intimately contacted in the Brabender [trademark] mixing apparatus for 3 minutes at a rotational speed of 40 rpm. The temperature of this contact was 130° C.

The polymeric product exiting from the Brabender [trademark] mixer was analyzed and found to have a melt index of 10.0 with no visible particles of unreacted sodium acetate observed in the product.

The results of this example are summarized in the Table.

EXAMPLES 4 and 5

Ionomerization of Vinyl Acetate Terpolymers

Example 3 was repeated but for the concentration of the ionomerizing agent. Instead of the 0.086 g. of sodium acetate in 0.7 g. of the ethylene-vinyl acetate-vinyl alcohol terpolymer of Example 3, the amounts of in situ formed sodium acetate in terpolymer was doubled in Example 4 and quadrupled in Example 5. That is, 0.17 g. and 0.35 g. of in situ formed sodium acetate in 1.4 g. and 2.8 g. of ethylene-vinyl acetate-vinyl alcohol terpolymer was charged into the reactor in Examples 4 and 5, respectively.

The polymeric products of these ionomerization reactions were polymers exhibiting no visible particles of unreacted sodium acetate in the product. The ionomers formed were characterized by a melt index of 0.9 and 0.13, in Examples 4 and 5, respectively.

Those skilled in the art are aware that the lower the melt index the greater the degree of crosslinkage. Thus, the effectiveness of the ionomerization agent of this invention is excellent. An arithmetic increase in ionomerizing agent results in almost a geometric increase in crosslinkage.

Examples 4 and 5 are summarized in tabular form in the Table.

TABLE

| Exam No. | Polymer Ionomerized | M.I. of Polymer Ionomerized | Ionomering Agent | Amount of Agent | Temp., °C., Ionomerizing Reaction | Time, min., Ionomerizing React | M.I. of Ionomer | Visible Particles in Ionomer |
|---|---|---|---|---|---|---|---|---|
| 1 | Monopropyl Maleate Grafted on HDPE (Acid No. of 3) | 10.0 | In-Situ $CH_3COONa$ | 0.175 g. (.002 mol.) in 1.42 g. | 180 | 10 | 0.5 | No |
| CE 1 | Monopropyl Maleate Grafted on HDPE (Acid No. of 3) | 10.0 | $CH_3COONa \cdot 3H_2O$ | 0.290 g. (.0021 mol.) | 180 | 10 | 3.8 | Yes |
| CE 2 | Monopropyl | 9.0 | $CH_3COONa$ | 0.300 g. | 180 | 10 | 5.8 | Yes |

TABLE-continued

| Exam No. | Polymer Ionomerized | M.I. of Polymer Ionomerized | Ionomering Agent | Amount of Agent | Temp., °C., Ionomerizing Reaction | Time, min., Ionomerizing React | M.I. of Ionomer | Visible Particles in Ionomer |
|---|---|---|---|---|---|---|---|---|
| | Maleate Grafted on HDPE (Acid No. of 3) | | | (.0036 mol.) | | | | |
| CE 3 | Monopropyl Maleate Grafted on HDPE (Acid No. of 3) | 9.0 | $CH_3COONa$ | 0.400 g. (.0049 mol.) | 180 | 10 | 5.4 | Yes |
| | Monopropyl Maleate Grafted on EVA (Acid No. of 7.9) | 50 | In-Situ $CH_3COONa$ | 0.086 g. (.001 mol.) in 0.7 g. | 130 | 3 | 10 | No |
| | Monopropyl Maleate Grafted on EVA (Acid No. of 7.9) | 50 | In-Situ $CH_3COONa$ | 0.17 g. (.002 mol.) in 1.4 g. | 130 | 3 | 0.9 | No |
| | Monopropyl Maleate Grafted on EVA (Acid No. of 7.9) | 50 | In-Situ $CH_3COONa$ | 0.35 g. (.004 mol.) in 2.8 g. | 130 | 3 | 0.13 | No |

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the instant invention should be limited only by the appended claims.

What is claimed is:

1. A process for preparing an ionomer comprising:
    (a) contacting a vinyl acetate polymer with a metal hydroxide at a temperature in the range of between about 160° C. and about 200° C. under shear, said metal of said hydroxide selected from the group consisting of alkali metals and alkaline earth metals; and
    (b) reacting the product of step (a) with a polymer having carboxylic acid or diacid anhydride functionality.

2. A process in accordance with claim 1 wherein said step (a) occurs in the liquid state by melting said vinyl acetate polymer and adding said hydroxide thereto.

3. A process in accordance with claim 1 wherein said step (a) occurs at a temperature in the range of between about 170° C. and about 190° C.

4. A process in accordance with claim 2 wherein said step (a) occurs over a period of between about 2 minutes and about 15 minutes.

5. A process in accordance with claim 1 wherein said step (b) occurs by mixing the molten product of step (a) with a melt of said polymer having carboxylic acid or diacid anhydride functionality.

6. A process in accordance with claim 5 wherein said step (b) occurs at a temperature at least about 5° C. above the melting temperature of said polymer having carboxylic acid or diacid anhydride functionality.

7. A process in accordance with claim 6 wherein said step (b) occurs at a temperature in the range of at least about 10° C. above the melting point of the polymer possessing carboxylic acid or diacid anhydride functionality.

8. A process in accordance with claim 6 wherein said step (b) occurs at a temperature in the range of between about 100° C. and about 200° C.

9. A process for preparing an ionomer comprising:
    (a) contacting a vinyl acetate polymer, selected from the group consisting of poly(vinyl acetate) and copolymers of ethylene and vinyl acetate, with a base selected from the group consisting of alkali metal hydroxides, alkaline earth metal hydroxides and mixtures thereof said contacting occurring at a temperature in the range of between about 160° C. and about 200° C. under shear; and
    (b) reacting the product of step (a) with an ionomerizable polymer having carboxylic acid or diacid anhydride functionality.

10. A process in accordance with claim 9 wherein said vinyl acetate polymer comprises at least 8% by weight of vinyl acetate and said ionomerizable polymer is selected from the group consisting of unsaturated monofunctional carboxylic acids polymers, unsaturated difunctional carboxylic acid polymers and diacid anhydride polymers.

11. A process in accordance with claim 10 wherein said vinyl acetate polymer is a copolymer of ethylene and vinyl acetate wherein said vinyl acetate is present in a concentration in the range of between about 8% and about 70% by weight and said ionomerizable polymer is a copolymer formed from a monomer selected from the group consisting of acrylic acid, an alkylacrylic acid, maleic acid, fumeric acid, a half ester of maleic acid, a half ester of fumeric acid and maleic anhydride.

12. A process in accordance with claim 11 wherein said vinyl acetate polymer is a copolymer of ethylene and vinyl acetate, wherein said vinyl acetate is present in a concentration in the range of between about 20% and about 50% by weight of said copolymer, and said ionomerizable polymer is a copolymer containing a monomer selected from the group consisting of maleic anhydride, acrylic acid, methacrylic acid, maleic acid and a half ester of maleic acid.

13. A process in accordance with claim 12 wherein said vinyl acetate polymer is a copolymer of ethylene and vinyl acetate wherein said vinyl acetate is present in a concentration of between about 28% and about 45% by weight and said ionomerizable polymer is a copolymer containing a monomer selected from the group consisting of maleic anhydride and a half ester of maleic acid.

14. A process in accordance with claim 9 wherein said base is an alkali metal hydroxide.

15. A process in accordance with claim 14 wherein said alkali metal of said alkali metal hydroxide is selected from the group consisting of potassium and sodium.

16. A process in accordance with claim 15 wherein said alkali metal hydroxide is sodium hydroxide.

17. A process for ionomerizing a polymer having carboxylic acid or diacid anhydride functionality comprising:
- (a) contacting a molten copolymer of ethylene and vinyl acetate with an alkali metal hydroxide at a temperature in the range of between about 160° C. and about 200° C. under shear whereby an alkali metal acetate is formed in-situ; and
- (b) contacting said molten polymer containing said in-situ formed alkali metal acetate with a molten graft copolymer of an alpha-olefin polymer and a monomer grafted thereon, said monomer selected from the group consisting of unsaturated monofunctional carboxylic acids, unsaturated difunctional carboxylic acids and diacid anhydrides.

18. A process in accordance with claim 17 wherein said alpha-olefin polymer of said molten graft copolymer is an ethylene polymer.

19. A process in accordance with claim 18 wherein said ethylene copolymer is an ethylene-vinyl acetate copolymer and said molten graft copolymer is a terpolymer of ethylene, vinyl acetate and a monomer selected from the group consisting of unsaturated monofunctional carboxylic acids, unsaturated difunctional carboxylic acids and diacid anhydrides.

20. A process in accordance with claim 17 wherein said step (a) occurs at a temperature in the range of between about 170° C. and 190° C. and said step (b) occurs at a temperature at least about 5° C. above the melting temperature of said graft copolymer.

21. A process in accordance with claim 20 wherein said alkali metal hydroxide is sodium hydroxide.

22. A process in accordance with claim 21 wherein said molten graft copolymer is selected from the group consisting of a copolymer of ethylene and maleic anhydride, a copolymer of ethylene and maleic acid, a copolymer of ethylene and a half ester of maleic acid, a copolymer of ethylene and acrylic acid, a copolymer of ethylene, vinyl acetate and maleic anhydride, a copolymer of ethylene, vinyl acetate and maleic anhydride, a copolymer of ethylene, vinyl acetate and maleic acid, a copolymer of ethylene, vinyl acetate and a half ester of maleic acid and a copolymer of ethylene, vinyl acetate and acrylic acid.

* * * * *